United States Patent [19]
Golze

[11] Patent Number: 5,232,759
[45] Date of Patent: Aug. 3, 1993

[54] FABRIC WEB FOR EROSION PROTECTION

[75] Inventor: Otto-Günter Golze, Hameln, Fed. Rep. of Germany

[73] Assignee: Otto Golze & Söhne GmbH, Fed. Rep. of Germany

[21] Appl. No.: 736,037

[22] Filed: Jul. 25, 1991

[30] Foreign Application Priority Data

Jul. 27, 1990 [DE] Fed. Rep. of Germany ....... 4024622

[51] Int. Cl.$^5$ ..................... D03D 27/00; D03D 27/08
[52] U.S. Cl. ...................................... 428/89; 428/92; 428/95; 428/97; 139/391; 139/396; 139/404; 112/410
[58] Field of Search .................. 428/89, 92, 97, 95; 139/391, 396, 404; 112/410

[56] References Cited

U.S. PATENT DOCUMENTS

| | | | |
|---|---|---|---|
| 384,046 | 6/1888 | Leake | 139/396 |
| 903,595 | 11/1908 | Margerison et al. | 139/396 |
| 1,386,450 | 8/1921 | Tully | 428/97 |
| 1,600,688 | 9/1926 | Margerison et al. | 139/396 |
| 1,611,660 | 12/1926 | Manly | 139/391 |
| 1,766,805 | 6/1930 | Wakefield | 139/396 |
| 1,934,942 | 11/1933 | Mostertz | 428/89 |
| 1,999,044 | 4/1935 | Frank | 139/391 |
| 2,355,789 | 8/1944 | Faber | 139/404 |
| 2,642,571 | 6/1953 | Brown | 139/391 |
| 2,677,871 | 5/1954 | Bloch et al. | 428/92 |
| 2,764,185 | 9/1956 | Mostertz | 139/391 |
| 3,015,148 | 1/1962 | Haddad | 28/72 |
| 3,441,063 | 4/1969 | Press et al. | 139/391 |
| 4,324,824 | 4/1982 | Narens et al. | 428/92 |
| 4,404,999 | 9/1983 | Woodall, Jr. et al. | 428/92 |
| 4,819,372 | 4/1989 | Schurholz | 47/9 |

FOREIGN PATENT DOCUMENTS

| | | | |
|---|---|---|---|
| 0235853 | 9/1987 | European Pat. Off. | |
| 8422934.9 | 10/1984 | Fed. Rep. of Germany | |
| 3294 | of 1871 | United Kingdom | 139/391 |
| 415 | of 1873 | United Kingdom | 139/391 |

Primary Examiner—George F. Lesmes
Assistant Examiner—Terrel Morris
Attorney, Agent, or Firm—Pravel, Hewitt, Kimball & Krieger

[57] ABSTRACT

A fabric web for the erosion protection of earth layers, particularly on embankments, which comprises hard vegetable fibers or mixed fibers with threads crossing one another at right angles, characterized in that individual threads project from the fabric plane at regular or irregular intervals in the form of loops or are tufted and in each case cover at least one crossing thread.

18 Claims, 1 Drawing Sheet

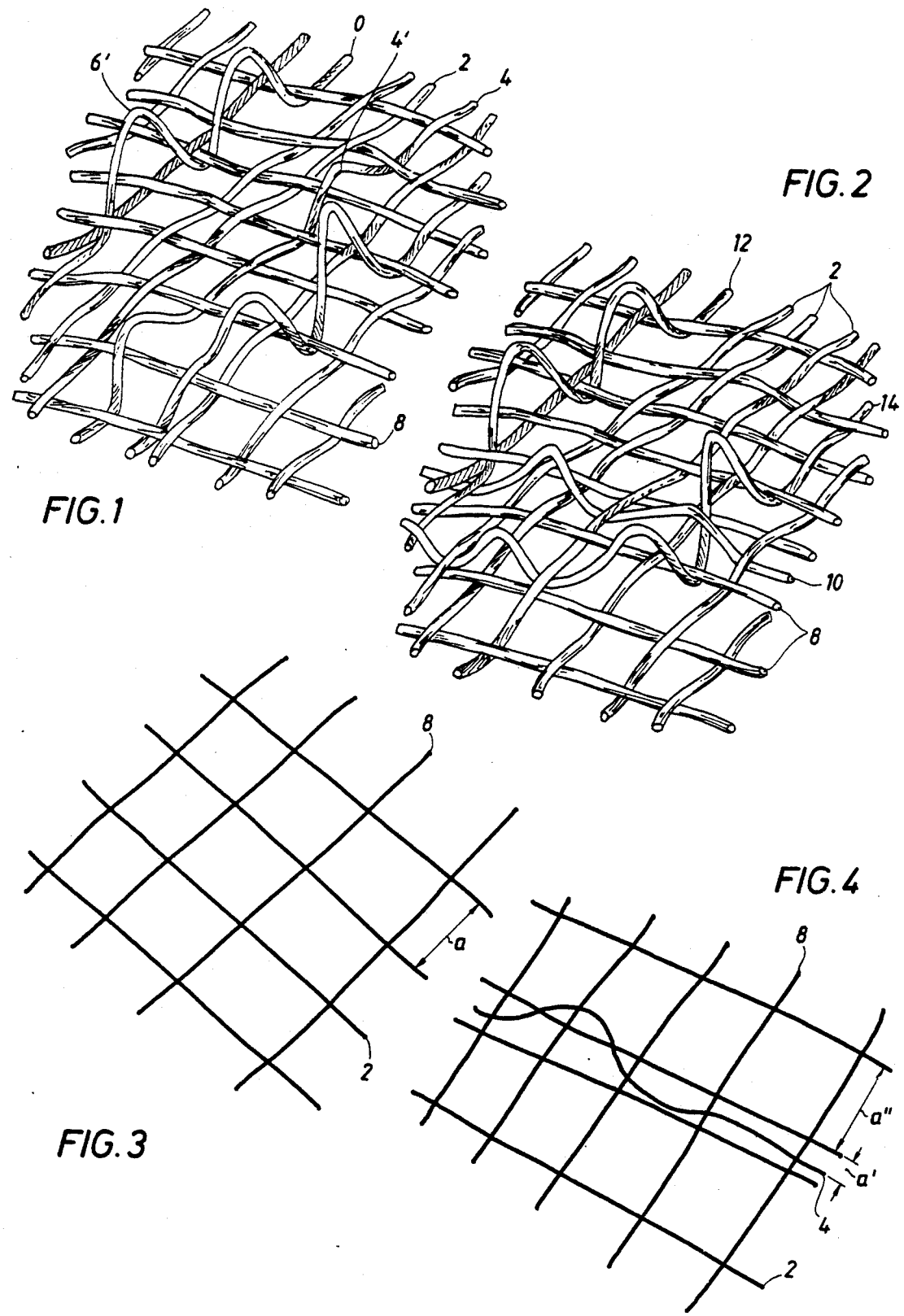

FABRIC WEB FOR EROSION PROTECTION

This application is based upon German Patent Application P 40 24 622.1 filed on Jul. 27, 1990.

BACKGROUND OF THE INVENTION

1. Field of the Invention

The invention relates to a fabric web for protecting heaped up earth or soil layers against erosion.

2. Description of the Prior Art

Fabric webs or this type are used for securing and fixing heaped up soil layers against washing away and erosion in landscaping, particularly on slopes, banks and embankments. The fabric webs are used in order to achieve a reliable and permanent landscaping. Additionally, the fabric webs are used to protect against washing away topsoil suitable for landscaping, which has been heaped up over a long period of time, prior to the occurrence of vegetation taking root and growing. To this end the erosion protective fabric or geotextiles are laid out flat on the earth layer to be fixed or secured and optionally floated in or are set up as protective strips so as to form fence-like structures.

In particular, coarse-mesh natural fiber fabrics have proved advantageous as protective fabrics combining a high water and air permeability with a high tensile strength. The use of natural fibers is also advantageous because over several vegetation periods natural fibers rot without leaving behind prejudicial residues and the fixing following the growth of the landscaping plants remains without any environmentally prejudicial effects. Such a fabric is known from German Utility Model 8422934, which discloses a support strip made from a vegetable hard fiber fabric and which is set up on edge for supporting an embankment cover. It is also known to lay out natural fiber fabrics in flat or net-like manner parallel to the soil surface, in order to avoid the removal of the native soil. However, in this particular use the known fabrics do not have a completely satisfactory action because as a result of their flat fabric structure they only to a very limited extent permit an amalgamation with the surrounding soil layer.

The problem needing to be resolved is to provide a fabric web, which can be laid out in the ground area to be secured and anchored there and whose fabric structure is such that a better connection and amalgamation are obtained between the fabric and the soil material, also outside the actual fabric surface, so as to insure a better protection of the surrounding soil layer against lateral removal and washing away or against erosion.

SUMMARY OF THE PRESENT INVENTION

The present invention is a fabric web for erosion protection of earth layers, particularly on embankments, which insures better protection of the soil layers against lateral removal and washing away or erosion.

The inventive fabric web is based on coarse-mesh natural fiber fabric formed from two thread systems crossing one another approximately at right angles and in Which separate threads are contained at regular or irregular intervals. These separate threads differ from the remaining threads in that they are not woven flat into the fabric throughout and instead at certain points project in the form of loops from the fabric surface or are tufted. This leads to a three-dimensional fabric structure comprising the actual fabric plane and the loops projecting at angles thereto. With this additional extension or dimension, the inventive fabric extends away from the actual fabric plane into the surrounding soil material and consequently insures an additional stabilization of the soil layer, particularly against driving away forces acting at angles to the soil surface, such as are caused by flowing rainwater or runoff. Thus, the protective fabric provides effective resistance to the floating away of the soil material due to flowing water. Before the anchoring of the soil or ground material, the three-dimensional construction of the fabric web has an effect by delaying the overflowing water and the incipient deposition of solids in the soil/water interface.

BRIEF DESCRIPTION OF THE DRAWINGS

A better understanding of the present invention may be had by reference to the following drawings and contained numerals therein of which:

FIG. 1 is a perspective view of the fabric web structure of the present invention.

FIG. 2 is a perspective view of the fabric web structure of the present invention.

FIG. 3 is a diagramatic view of a fabric web having substantially uniform spacing of threads.

FIG. 4 is a diagramatic view of a preferred embodiment having altered spacing of threads

DETAILED DESCRIPTION OF THE INVENTION

The fabric shown in FIG. 1 has two thread systems crossing one another at right angles and constituted by warp threads 2 and weft threads 8. In regular fabrics the warp threads 2 alternately cross the weft threads 8 above and below the weft thread plane taking the shortest path. As shown in FIGS. 1 and 2, in the present invention, this regular fabric structure is in part broken or discontinued by individual loop threads 4,6 which are lengthened to form upwardly extending loops 4', 6'. The loop threads may be formed substantially as warp threads 10 or weft threads 12, irregularly placed, non-warp, non-weft threads 14, or various combinations thereof. In the inventive embodiment as shown in FIG. 1, the loop threads 4,6 form extensions of the fabric web instead of always crossing threads 8 along the shortest path. Along the individual loop thread 4, the loops 4' alternate with the closer crossing areas with the weft threads 8, as is indicated for the loop 4', which insures a reliable binding in the loop thread 4 provided with the loops 4' into the fabric. The loop thread 4 or 6 can also jump a warp thread 2 and can be irregularly guided in various different ways.

The loops 4', 6' can be regularly or irregularly distributed along the warp threads 4, 6. They can also differ as regards their circumference in such a way that more than one weft thread 8 is accurately covered by a loop 4', 6'. Numerous possible variations of the fabric structure can take place with regards to the frequencies of warp threads 4, 6 provided with loops 4', 6' and with regards to the arrangement and distribution of loops 4', 6' on the warp threads 4, 6. Thus, according to a particularly preferred embodiment, the warp threads 4, 6 forming the loops 4', 6' can be closely held on either side in each case by one adjacent warp thread 2 and can have a greater distance from the next warp threads. This is demonstrated by comparing FIGS. 3 and 4. In FIG. 3, a regular distance (a) is defined between adjacent warp threads 8. In the preferred embodiment, as demonstrated by FIG. 4, a loop thread 4 can be closely held on either side by an adjacent thread 2, such that the distance (a') between a loop thread and an adjacent non-loop thread is less than the regular distance (a) between two non-loop threads. In addition, the distance (a") between the non-loop thread adjacent to a loop thread and the next-adjacent non-loop thread is greater than the regular distance (a) between non-loop threads. The projecting warp thread 4, 6 need also not be bounded by straight warp threads 2. It is possible to use for the warp threads 2 and/or for the projecting threads 4, 6 those having a considerable roughness, such as coconut threads with a jute structure.

The fabric is made from vegetable fibers, such as e.g. coconut, sisal, jute or hemp fibers, or also straw and flax, optionally combined with the aforementioned hard fibers. The use of such hard fibers or mixed fibers gives the loops 4', 6' an adequate stability, so that there is a resistance against lateral removal and washing away and the heaped up soil layer is secured. For this purpose the loops 4', 6' should be given an adequate height and preferably project at least 0.5 to 1.0 cm from the fabric surface. The use of vegetable fibers is advantageous because the protective fabric, following the growth of the landscaping plants, rots in the soil layer without leaving prejudicial residues.

The fabric is produced in the form of a long protective fabric web, which is rolled out and laid at the point of use. For covering, larger surfaces, several webs are tied together in juxtaposed manner or are pinned in overlapping form or anchored in the soil in some other way. In place of a fabric web, it is possible to use any random textile web, which can also be tufted.

The description given herein is intended to illustrate the preferred embodiment of the present invention. It will be apparent from the foregoing that various changes may be made in the details of construction and configuration without departing from the spirit of the invention. Therefore, it is intended that all such variations be included within the scope of the present invention as described and claimed.

I claim:

1. A fabric web for the erosion protection of earth layers, the fabric web comprising:
   a plurality of threads crossing one another at substantially right angles forming a fabric web plane, said plurality of threads including warp threads and weft threads, said warp threads crossing said weft threads; and
   individual loop threads projecting from said fabric web plane at irregular intervals with respect to the fabric web plane in the form of loops or said individual loop threads are tufted and in each case cover at least one crossing thread;
   wherein said warp, weft, and loop threads are made exclusively from vegetable fibers.

2. A fabric web according to claim 1, wherein said individual loop threads are arranged substantially parallel to said warp threads, substantially parallel to said weft threads, irregularly arranged within said web, or combinations thereof.

3. The fabric web according to claim 1, wherein each said individual loop thread jumps over at least one of said warp threads.

4. The fabric web according to claim 1, wherein each of said threads jumps over at least one said weft thread.

5. The fabric web according to claim 1, having a distance defined between adjacent warp or weft threads, wherein said distance is substantially regular throughout said fabric web.

6. The fabric web according to claim 5, having a distance defined between a loop thread and an adjacent warp or weft thread, wherein said distance between a loop thread and an adjacent warp or weft thread is less than the distance between adjacent warp or weft threads.

7. The fabric web according to claim 6, having a distance defined between a warp or weft thread adjacent to a loop thread and a next-adjacent warp or weft thread, wherein said distance between a warp thread adjacent to a loop thread and a next-adjacent warp or weft thread is greater than the distance between warp or weft threads not adjacent to a loop thread.

8. The fabric web according to claim 1, wherein the loops of said loop threads project out of said fabric web plane by at least 1.0 cm.

9. The fabric web according to claim 7, wherein the loops of said loop threads project out of said fabric web plane by at least 1.0 cm.

10. A fabric web for the erosion protection of earth layers, the fabric web comprising:
    a plurality of threads crossing one another at substantially right angles to form a generally planar web;
    a plurality of loop threads passing through said generally planar web and crossing above and below said planar web or irregular intervals;
    wherein said loop threads project from the plane of said web in the form of loops, and wherein the fabric and threads are made exclusively from vegetable fibers.

11. The fabric web of claim 10, wherein each of said loop threads loop crosses at least one said thread forming said generally planar web.

12. The fabric web of claim 11, wherein said loops project out of said fabric web plane by at least 1 cm.

13. The fabric web of claim 12, wherein all said threads and said loop threads are made out of vegetable fibers.

14. A fabric web for the erosion protection of earth layers, the fabric web comprising:
    a plurality of weft threads in a substantially parallel, planar arrangement;
    a plurality of warp threads in a substantially parallel arrangement;
    wherein said warp threads are substantially perpendicular to said weft threads and said warp threads alternatively cross said weft threads above and below said weft thread plane to form a generally planar web; and
    a plurality of loop threads passing through said generally planar web and crossing above and below said generally planar web;
    wherein said loop threads project from the plane of said web in the form of loops, and wherein the fabric and threads are made exclusively from vegetable fibers.

15. The fabric web of claim 14, wherein the loops of said loop threads project out of said fabric web plane by at least 0.5 cm.

16. The fabric web of claim 15, wherein said loops project out of said fabric web plane by a least 1 cm.

17. The fabric web of claim 14, wherein each of said loop threads crosses at least one said warp thread or one said weft thread.

18. The fabric web of claim 15, wherein said loops project from said generally planar web in irregular intervals.

* * * * *